US005757609A

United States Patent [19]

Yamana

[11] Patent Number: 5,757,609
[45] Date of Patent: May 26, 1998

[54] CERAMIC CAPACITOR

[75] Inventor: Tsuyoshi Yamana, Kyoto, Japan

[73] Assignee: Murata Manufacturing Co., Ltd., Kyoto, Japan

[21] Appl. No.: 455,103

[22] Filed: May 31, 1995

[30] Foreign Application Priority Data

Jun. 1, 1994 [JP] Japan ................................. 6-120253
Oct. 26, 1994 [JP] Japan ................................. 6-262747

[51] Int. Cl.$^6$ ................................. H01G 4/008
[52] U.S. Cl. ................................. 361/305; 361/303
[58] Field of Search ................................. 361/301.1, 305, 361/311, 321.1–321.5, 318, 319, 523, 524, 528, 303, 309

[56] References Cited

U.S. PATENT DOCUMENTS 4,127,424  11/1978  Ullery, Jr. .
4,451,869  5/1984  Sakabe et al. .
4,865,772  9/1989  Suehiro et al. .
5,332,596  7/1994  Tani et al. .

FOREIGN PATENT DOCUMENTS 58-71507  4/1983  Japan .

Primary Examiner—Leo P. Picard
Assistant Examiner—Phuong T. Vu
Attorney, Agent, or Firm—Ostrolenk, Faber, Gerb, & Soffen, LLP

[57] ABSTRACT

A ceramic capacitor with a dielectric ceramic body having on the surface thereof a baked electrode containing a fine copper powder and a glass frit containing at least one member selected from boron oxide, lead oxide, and zinc oxide, the content of the glass frit being from 2 to 20 wt % based on the amount of the fine copper powder.

7 Claims, 2 Drawing Sheets

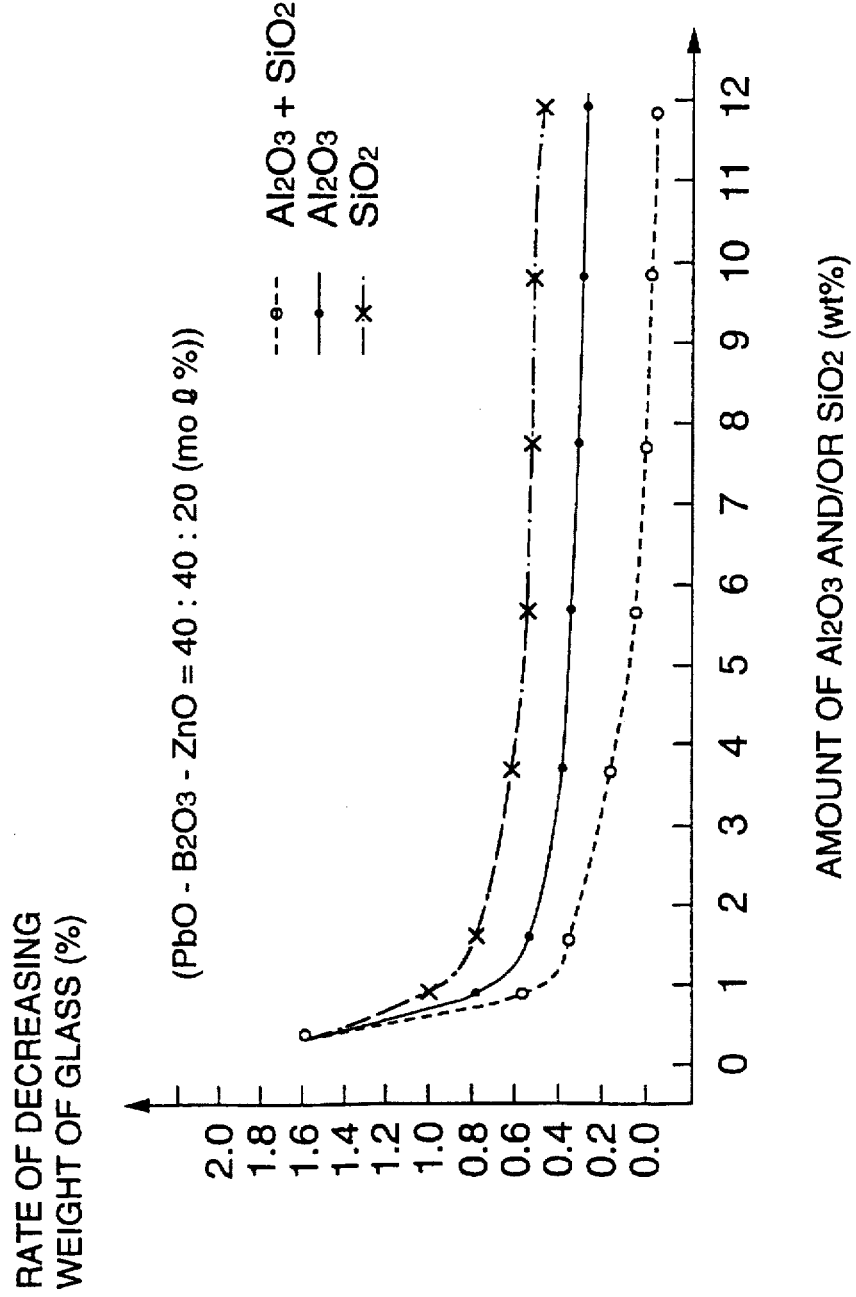

CERAMIC CAPACITOR

FIELD OF THE INVENTION

The present invention relates to a ceramic capacitor, and particularly to a ceramic capacitor composed of a copper-baked electrode.

BACKGROUND OF THE INVENTION

Conventionally, a ceramic capacitor is generally formed by applying a paste comprising a fine silver oxide (AgO) powder as an electric conductive ingredient, and a low melting point glass frit incorporated therein on a dielectric ceramic body by means of a screen printing method or other means, followed by baking. This silver-baked electrode is advantageous in excellent electrical properties, good high frequency characteristics, and high reliability, as well as easy and simple production of an electrode film.

However, in the conventional silver-baked electrode, silver is an expensive material and there has been restriction to reduce the production cost.

Moreover, in the case where an external electrode such as a conductor pattern of printed circuit or a lead wire is soldered to the silver-baked electrode, since there is a high tendency to bring about so-called "solder leach phenomenon" in that silver is diffused and migrated into solder, the adhesion strength of the electrode to the ceramic body is in some cases lowered or deterioration in capacitor characteristics such as poor electrostatic capacity takes place.

Furthermore, migration of silver tends to occur, resulting in poor reliability such as a decrease in dielectric strength. In particular, since it is impossible to completely prevent a dielectric ceramic body from micro-cracks due to thermal shock in the course of soldering, there is a tendency that silver is diffused and migrated into the microcracks, so that the migration of silver becomes accelerated, resulting in reduced reliability.

As a means for overcoming the disadvantages of the conventional silver-baked electrode described above, a copper-baked electrode is proposed in JP-B-1-51003 (the term "JP-B" used herein means a Japanese examined patent publication). This copper-baked electrode comprises a fine copper powder and a glass frit comprising at least one member selected from lead borosilicate, bismuth borosilicate, and zinc borosilicate as main ingredients, in which the amount of the glass frit is 2 to 40% by volume based on the amount of the fine copper powder. The copper-baked electrode is formed by dispersing the fine copper powder and the glass frit into an organic vehicle to form a paste, applying the paste on a dielectric ceramic body by a method such as a screen printing, and baking it in a neutral atmosphere (nitrogen).

However, it is necessary for the copper-baked electrode to bake the paste at a high temperature of not less than 800° C., so as to make the electrode dense. If the densification is insufficient, solder permeates into the electrode and causes deterioration in electrostatic capacity and terminal strength. Furthermore, copper, which is a base metal, must be baked in a neutral atmosphere to prevent oxidation, but baking in a neutral atmosphere at a high temperature proceeds with reduction of the dielectric ceramic body, which causes a lowered capacity when processed into a capacitor.

SUMMARY OF THE INVENTION

An object of the present invention is, therefore, to provide a high performance ceramic capacitor which can prevent the generation of the solder leach phenomenon and silver migration; has excellent high frequency characteristics, reliability, soldering property, service life characteristics, etc.; and possesses a large electrostatic capacity and a low dielectric loss.

Another object of the present invention is to provide a highly reliable ceramic capacitor having a low rate of decrease in capacity and low dielectric loss in a humidity resistant load test.

Other objects and effects of the present invention will be apparent from the following description.

The present invention relates to a ceramic capacitor comprising a dielectric ceramic body having on the surface thereof a baked electrode comprising a fine copper powder and a glass frit comprising at least one member selected from boron oxide, lead oxide, and zinc oxide, the content of the glass frit being from 2 to 20 wt % based on the amount of the fine copper powder.

BRIEF DESCRIPTION OF THE DRAWINGS

FIG. 2 shows the relationship between the rate of decreasing the weight of glass and the amount of $Al_2O_3$ and/or $SiO_2$ added.

DETAILED DESCRIPTION OF THE INVENTION

Figure 1:
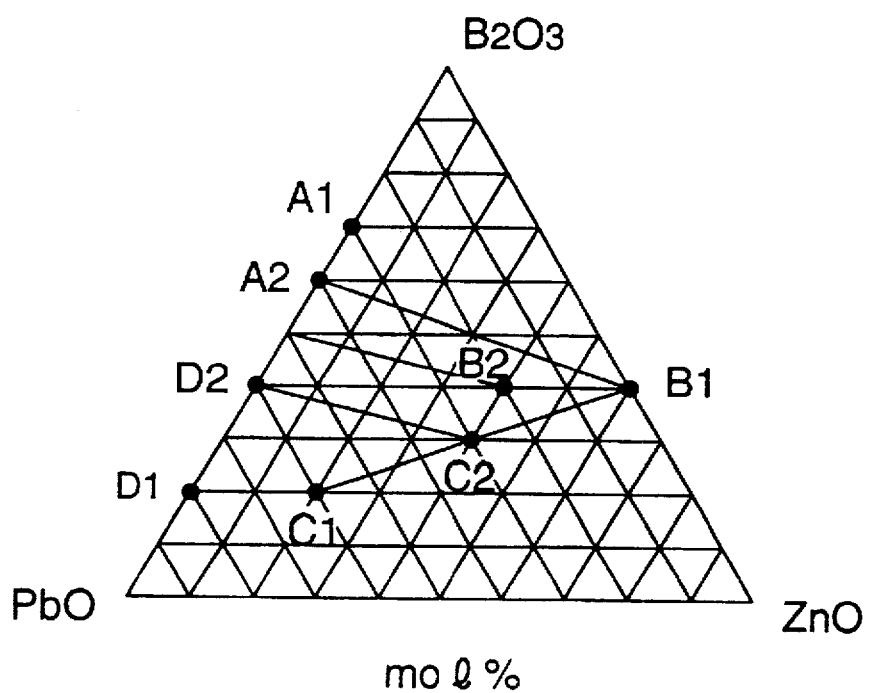
FIG. 1 shows a ternary diagram of the glass frit used in the present invention.

In a first preferred embodiment, the ceramic capacitor according to the present invention comprises a glass frit comprising at least one member selected from boron oxide, lead oxide, and zinc oxide, and at least one member selected from $Al_2O_3$ and $SiO_2$ as modification oxides. In this preferred embodiment, the glass frit preferably contains at least one member selected from $Al_2O_3$ and $SiO_2$ as modification oxides in an amount of from 0.5 to 10.0 wt % based on the total amount of the glass frit.

In a second preferred embodiment, the ceramic capacitor of the present invention, a glass frit comprising at least one member selected from boron oxide, lead oxide, and zinc oxide, and at least one member selected from $Al_2O_3$ and $SiO_2$, as well as $R_2O$, where R represents at least one metal selected from Li, Na, K, Rb, and Cs, as modification oxides. In this preferred embodiment, the glass frit preferably contains at least one member selected from $Al_2O_3$ and $SiO_2$ as modification oxides in an amount of from 0.5 to 10.0 wt % based on the total amount of the glass frit, and $R_2O$, where R represents at least one metal selected from Li, Na, K, Rb, and Cs, as modification oxides in an amount of from 0.2 to 1.0 wt % based on the total amount of the glass frit.

The glass frit preferably has a softening point of from 350° to 500° C.

The glass frit comprising at least one member selected from boron oxide, lead oxide, and zinc oxide preferably falls within the region surrounded by lines connecting the apices A1 (30, 70, 0), B1 (0, 40, 60), C1 (60, 20, 20), D1 (80, 20, 0) in terms of (X, Y, Z) mol % in the ternary diagram of $xPbO$—$yB_2O_3$—$zZnO$, and more preferably falls within the region surrounded by lines connecting the apices A2 (40, 60, 0), B2 (20, 40, 40), C2 (30, 30, 40), D2 (60, 40, 0) in terms of (X, Y, Z) mol % in the ternary diagram of, $xPbO$—$yB_2O_3$—$zZnO$.

The fine copper powder used in the present invention is preferably coated with boric acid on the surface thereof.

The dielectric ceramic body used in the present invention preferably comprises barium titanate.

The glass frit according to the present invention is used in an amount of from 2 to 20 wt % based on the amount of the copper powder. If the amount of the glass frit is less than 2 wt %, the adhesion strength between the baked electrode and the dielectric ceramic body is insufficient. If the amount of the glass frit is more than 20 wt %, the electric conductivity is lowered and, thus, good capacity and dielectric loss cannot be obtained.

The fine copper powder used in the present invention preferably has a spherical shape and a particle size determined by scanning electron microscope (SEM) of not more than 10 μm. If the particle size is outside this range the sintering of the electrode tends to be insufficient.

The copper powder and the glass frit are generally kneaded with an inert organic vehicle (binder), such as ethyl cellulose dissolved in terpineol, to be made into a paste. In the paste, the total content of the copper powder and the glass frit is generally from 90 to 70 wt % and the content of the organic vehicle is generally from 10 to 30 wt %.

The glass frit comprising at least one member selected from boron oxide, lead oxide, and zinc oxide as essential ingredients preferably falls within the region surrounded by lines connecting the apices A1, B1, C1, and D1 shown in FIG. 1. If the composition is at a point above the line connecting A1 and B1, increase in dielectric loss, decrease in terminal strength, and poor soldering tend to take place, resulting in insufficient practical characteristics. If the composition is below the lines connecting B1, C1, and D1, although capacity and dielectric loss are good, terminal strength tends to be reduced, resulting in a problem of poor soldering.

When the glass frit falls within the region surrounded by the lines connecting the apices A2, B2, C2, and D2 shown in FIG. 1, various characteristics of the ceramic capacitor having the copper-baked electrode can further be improved.

The glass frit used in the present invention is a lead-borate-zinc glass. The softening point of the glass is preferably in the range of from 350° to 500° C. If it is less than 350° C., the viscosity of the glass frit tends to become too low at baking, the glass is diffused into the ceramic body and, thus, the adhesion strength between the electrode and the ceramic body tends to be poor. If it exceeds 500° C., since the glass is not sufficiently melted by the intended low temperature baking (e.g., from 550° to 650° C.), the adhesion strength between the electrode and the ceramic body tends to be insufficient, resulting in an increased dielectric loss and a reduced terminal strength.

In the first preferred embodiment, the glass frit contains at least one member selected from $Al_2O_3$ and $SiO_2$ as modification oxides. The amount of $Al_2O_3$ and $SiO_2$ as modification oxides is preferably from 0.5 to 10.0 wt % based on the total amount of the glass frit.

If the amount of the at least one modification oxide selected from $Al_2O_3$ and $SiO_2$ is less than 0.5 wt %, decrease in capacity and increase in dielectric loss tend to occur under a humidity resistant load test. If it exceeds 10.0 wt %, the softening point of the glass becomes not less than 500° C., sometimes causing problems in that it is impossible to carry out low temperature sintering (e.g., 550° to 650° C.), the adhesion strength between the electrode and the ceramic body is insufficient, and as for the initial characteristics, the capacity is lowered and the dielectric loss is increased.

In a second preferred embodiment, the glass frit further comprises at least one $R_2O$, where R represents at least one metal selected from Li, Na, K, Rb, and Cs, as modification oxides. The amount of $R_2O$ as modification oxides is preferably from 0.2 to 1.0 wt % based on the total amount of the glass frit.

A small amount of an alkali metal added has an effect of suppressing the phase separation of glass against external causes such as heat, atmosphere and electric current, without lowering the water resistance of the glass. Since the conditions of glass skeleton structure and the distribution of the constituting ingredients of the glass are changed if phase separation of glass takes places, the resistance of the glass is changed and the dielectric loss increases. The addition of small amount of the modification oxide, $R_2O$ (where R represents at least one metal selected from Li, Na, K, Rb, and Cs) is effective, but if it is less than 0.2 wt %, no effect can be obtained, whereas the addition of an amount exceeding 1.0 wt % may influence the water resistance of the glass, causing the acceleration of decrease in capacity and increase in dielectric loss.

The ceramic body used in the present invention may comprise various ceramic compositions, preferably barium titanate. Examples of the ceramic composition containing barium titanate as a main component are described below.

(1) JP-B-63-48826

A highly dielectric ceramic composition comprising 100 parts by weight of $BaTiO_3$ having an alkali metal oxide content of not more than 0.04% by weight as impurity, 1.0 to 2.5 parts by weight of $Nb_2O_5$, 0.3 to 1.0 part by weight of $Nd_2O_3$, 0.1 to 0.8 part by weight of $Co_2O_3$, and 0.1 to 1.2 parts by weight of $SiO_2$.

(2) JP-B-55-48645

A highly dielectric ceramic composition comprising 93 to 97% by weight of $BaTiO_3$, 2.5 to 4.5% by weight of a mixture of $Bi_2O_3$ and $SnO_2$ in a molar ratio of 0.4 to 1.0, and 0.9 to 2.6% by weight of a mixture of $Nd_2O_3$ or $La_2O_3$ and $ZrO_2$ in a molar ratio of 0.5 to 2.0.

(3) JP-B-60-31793

A dielectric ceramic composition comprising 85 to 90% by weight of $BaTiO_3$, 8.5 to 12.0% by weight of $CaZrO_3$, up to 0.5% by weight of $MgTiO_3$, up to 0.5% by weight of $CeO_2$, 0.1 to 1.0% by weight of $Bi_2O_3$, and 0.1 to 1.0% by weight of $SnO_2$.

The surface of the fine copper powder used in the present invention is preferably coated with boric acid. The coating of boric acid can be effected by mixing a solution containing 0.01 to 0.1 wt % of boric acid (as boron atoms based on copper atoms) in a solvent (e.g., ketone, hydrocarbon and aromatic solvents) and the copper powder, and drying the mixture to remove the solvent.

If the fine copper powder is coated with boric acid as described above, boric acid is melted at approximately 300° C. to come into a glass state, which protects the fine copper powder from the external atmosphere. Therefore, the oxidation of the fine copper powder by the oxygen contained in air to decompose the binder can be prevented. That is, a boric acid film is formed on the surface of the fine copper powder, whereby the oxidation of the fine copper powder and reduction of the dielectric ceramic body can be prevented. Furthermore, if the fine copper powder is coated with boric acid in the baked copper electrode, since boron becomes a glass state at 300° C. and then the glass frit is softened at 350° to 500° C., the copper powder develops a good wetting ability with the glass frit, making it possible to form a dense electrode at a baking temperature of approximately 550° to 650° C., which can prevent the permeation of solder.

Since the ceramic capacitor of the present invention comprises an electrode comprising a fine copper powder and a glass frit comprising at least one member selected from boron oxide, lead oxide and zinc oxide, the generation of solder leach phenomenon and silver migration, which are unavoidable in the silver electrode, can be prevented. Accordingly, a high performance ceramic capacitor exhibiting excellent high frequency characteristics, reliability, soldering property, service life characteristics, etc., and having a high electrostatic capacity, and small dielectric loss can be obtained.

Further, by the addition of at least one modification oxide selected from $Al_2O_3$ and $SiO_2$, the rate of lowering the capacity and the rate of increasing the dielectric loss can be suppressed by 50%.

Still further, the addition of a small amount of at least one modification oxide selected from $R_2O$ (R represents at least one metal selected from Li, Na, K, Rb, and Cs) the rate of lowering the capacity and the rate of increasing the dielectric loss can be further decreased by 50%.

The present invention will be described in greater detail by referring to the following Examples, but the invention is not construed as being limited thereto.

EXAMPLE 1

A paste for a copper-baked electrode was prepared. A fine copper powder having a particle size of 1 μm was admixed with 0.01 to 0.1 wt % of boric acid as boron atom content based on the fine copper powder, and a solvent selected from ketone solvents, hydrocarbon solvents and aromatic solvents in such an amount that the concentration of boric acid was not more than saturated concentration, and then dried to remove the solvent, giving a fine copper powder coated with boric acid.

A paste for a copper-baked electrode was produced by thoroughly dispersing 80 wt % of the boric acid-coated fine copper powder, 8 wt % of PbO—$B_2O_3$—ZnO glass frit having mole percent compositions shown in Table 1, and 12 wt % of organic vehicle produced by dissolving cellulose in terpineol (concentration: 8 wt %) through a kneader such as a three-roll mill. In this example, the amount of the glass frit was approximately 9.09 wt % based on the amount of the fine copper powder.

The resulting paste was applied on a barium titanate ceramic, as a dielectric ceramic body, comprising $BaTiO_3$ to which $Nb_2O_5$, $Nd_2O_3$, $Co_2O_3$ and $SiO_2$ were added as described in JP-B-63-48826 by a screen printing, and then it was baked at a peak temperature of 600° C. for a retaining period of 10 minutes and a total period of baking of 60 minutes in a neutral atmosphere (nitrogen).

The ceramic capacitor thus obtained was measured for electrostatic capacity, dielectric loss, terminal strength, soldering property, and permeation of solder. The results obtained are also shown in Table 1.

The tensile strength of the electrode was measured in the following manner: A lead wire having a diameter of 0.6 mm was soldered to an electrode formed by baking on a circular dielectric ceramic body having a diameter of 8.0 mm and a thickness of 0.4 mm in the manner described above, and the tensile strength was measured at a constant speed of 120 mm/min.

The soldering property was measured in the following manner: The dielectric ceramic body having the electrode was immersed in molten solder using a rosin flux, and the soldering property was visually evaluated.

The permeation of solder was visually evaluated by polishing the cross-section of the electrode.

In Table 1, samples marked with an asterisk (*) are outside the scope of the present invention, and the other samples are within the scope of the present invention.

TABLE 1

| Sample No. | Glass frit (mol %) | | | Electrostatic capacity (pF) | Dielectric loss (%) | Terminal Strength (Kg) | Soldering property | Permeation of solder |
| --- | --- | --- | --- | --- | --- | --- | --- | --- |
| | PbO | $B_2O_3$ | ZnO | | | | | |
| *1-1 | 20 | 80 | 0 | — | — | — | Poor | — |
| 1-2 | 40 | 60 | 0 | 3570 | 1.7 | 3.1 | Very good | Good |
| 1-3 | 20 | 60 | 20 | 3350 | 1.9 | 1.5 | Good | Good |
| *1-4 | 0 | 60 | 40 | 3510 | 3.2 | 0.5 | Poor | — |
| 1-5 | 60 | 40 | 0 | 3680 | 1.9 | 3.4 | Very good | Good |
| 1-6 | 40 | 40 | 20 | 3720 | 1.8 | 4.5 | Very good | Good |
| 1-7 | 20 | 40 | 40 | 3690 | 1.8 | 4.3 | Very good | Good |
| 1-8 | 0 | 40 | 60 | 2990 | 1.5 | 1.6 | Good | Good |
| 1-9 | 80 | 20 | 0 | 3620 | 1.8 | 2.5 | Good | Good |
| 1-10 | 60 | 20 | 20 | 3640 | 1.5 | 1.3 | Good | Good |
| *1-11 | 40 | 20 | 40 | 3570 | 1.7 | 0.3 | Poor | — |
| 1-12 | 30 | 30 | 40 | 3650 | 1.7 | 4.2 | Very good | Good |
| 1-13 | 30 | 70 | 0 | 3550 | 1.8 | 3.0 | Good | Good |
| *1-14 | 10 | 70 | 20 | 3520 | 2.8 | 0.2 | Poor | — |

As is clear from Table 1, the samples of the present invention had a good soldering property, a small dielectric loss and a large terminal strength.

In Table 1, Sample No. 1-1 deviated from the adequate range of vitrification, and did not show good characteristics. In Sample Nos. 1-4 and 1-14, although they showed good capacity, their dielectric loss was large, their terminal strength was low, and their soldering property was poor. Sample No. 1-11 was found to show good values for the capacity and dielectric loss, but to show a low terminal strength and was not soldered.

A paste for a copper-baked electrode was produced by thoroughly dispersing 1 to 22 wt % of PbO—$B_2O_3$—ZnO glass frit having a molar percentage composition for Sample No. 1-6 in Table 1 and 66 to 87 wt % of the above-mentioned boric acid-coated fine copper powder, and 12 wt % of an organic vehicle produced by dissolving cellulose in terpineol (concentration: 8 wt %) through a kneader such as a three-roll mill. The electrostatic capacity, the dielectric loss, the terminal strength, the soldering property and the permeation of solder were determined in the same manner as those in Table 1. The results are shown in Table 2. In Table 2, samples marked by an asterisk (*) are outside the scope of the present invention, and the other samples are within the scope of the present invention.

TABLE 2

| Sample No. | Fine Cu powder (wt %) | Glass frit (wt %) | Organic vehicle (wt %) | Electrostatic capacity (pF) | Dielectric loss (%) | Terminal strength (kg) | Soldering property | Permeation of solder |
| --- | --- | --- | --- | --- | --- | --- | --- | --- |
| *2-1 | 87 | 1 | 12 | 3160 | 2.0 | 0.3 | Poor | — |
| 2-2 | 85 | 3 | 12 | 3540 | 1.9 | 1.2 | Good | Good |
| 2-3 | 78 | 10 | 12 | 3730 | 1.8 | 4.3 | Very good | Good |
| 2-4 | 73 | 15 | 12 | 3680 | 1.7 | 4.0 | Very good | Good |
| 2-5 | 70 | 18 | 12 | 3290 | 1.9 | 3.1 | Good | Good |
| *2-6 | 66 | 22 | 12 | 2850 | 3.4 | 0.4 | Poor | — |

As is clear from Table 2, the samples of the present invention had good soldering property, a small dielectric loss and a large terminal strength.

In Table 2, Sample No. 2-1 had a low adhesion strength between the electrode and the dielectric ceramic body, and Sample No. 2-6 had a low electric conductivity.

The glass frit of Sample No. 1-6 shown in Table 1 was examined for coloring of the electrode, soldering property, and solder permeation depending on the baking temperature. The results are shown in Table 3.

The soldering property was measured in the following manner: The dielectric ceramic body having the electrode was immersed in molten solder using a rosin flux, and the soldering property was visually evaluated.

TABLE 3

| Baking temperature (°C.) | Coloring of electrode due to burning Visual observation of appearance | Soldering property Solder: H60A Rosin flux Visual observation | Permeation of solder Polishing cross-section Visual observation |
| --- | --- | --- | --- |
| 400 | Poor | Poor | — |
| 450 | Medium | Medium | — |
| 500 | Good | Good | Medium |
| 550 | Good | Good | Good |
| 600 | Good | Good | Good |
| 650 | Good | Good | Good |
| 700 | Medium | Medium | Good |
| 800 | Poor | Poor | — |
| 900 | Poor | Poor | — |

As shown in Table 3, in a temperature range of 500° to 650° C., the electrode was baked in a good condition, and the soldering property was found to have a value of not less than 90%. As a result of the visual evaluation of solder permeation by polishing the cross-section of the electrode, in a temperature range of 550° to 700° C., no solder permeation was observed. Consequently, the optimum baking temperature could be considered to be in the range of 550° to 650° C.

EXAMPLE 2

A paste for a copper-baked electrode was prepared. A fine copper powder having a particle size of 1 μm was admixed with 0.01 to 0.1 wt % of boric acid as boron atom content based on the fine copper powder, and a solvent selected from ketone solvents, hydrocarbon solvents and aromatic solvents in such an amount that the concentration of boric acid was not more than saturated concentration, and then dried to remove the solvent, giving a fine copper powder coated with boric acid.

A paste for a copper-baked electrode was produced by thoroughly dispersing 80 wt % of the boric acid-coated fine copper powder, 8 wt % of PbO—$B_2O_3$—ZnO glass frit having mole percent compositions shown in Table 4, and 12 wt % of organic vehicle produced by dissolving cellulose in terpineol (concentration: 8 wt %) through a kneader such as a three-roll mill. In this example, the amount of the glass frit was approximately 9.09 wt % based on the amount of the fine copper powder.

The resulting paste was applied on a barium titanate ceramic, as a dielectric ceramic body, comprising $BaTiO_3$ to which $Bi_2O_3$, $SnO_2$, $Nd_2O_3$, $La_2O_3$ and $ZrO_2$ were added as described in JP-B-55-48645 by a screen printing, it was baked at a peak temperature of 600° C. for a retaining period of 10 minutes and a total period of baking of 60 minutes in a neutral atmosphere (nitrogen).

The ceramic capacitor thus obtained was measured for electrostatic capacity, dielectric loss, terminal strength, soldering property, and permeation of solder. The results obtained are also shown in Table 4.

The tensile strength of the electrode was measured in the following manner: A lead wire having a diameter of 0.6 mm was soldered to an electrode formed by baking on a circular dielectric ceramic body having a diameter of 14.0 mm and a thickness of 0.5 mm in the manner described above, and the tensile strength was measured at a constant speed of 120 mm/min.

The soldering property was measured in the following manner: The dielectric ceramic body having the electrode was immersed in molten solder using a rosin flux, and the soldering property was visually evaluated.

The permeation of solder was visually evaluated by polishing the cross-section of the electrode.

In Table 4, samples marked with an asterisk (*) are outside the scope of the present invention, and the other samples are within the scope of the present invention.

TABLE 4

| Sample No. | Glass frit (mol %) PbO | B$_2$O$_3$ | ZnO | Electrostatic capacity (pF) | Dielectric loss | Terminal Strength | Soldering property | Permeation of solder |
|---|---|---|---|---|---|---|---|---|
| *3-1 | 20 | 80 | 0 | — | — | — | Poor | — |
| 3-2 | 40 | 60 | 0 | 7160 | 1.6 | 3.5 | Very good | Good |
| 3-3 | 20 | 60 | 20 | 6520 | 1.9 | 1.2 | Good | Good |
| *3-4 | 0 | 60 | 40 | 5920 | 3.2 | 0.1 | Poor | — |
| 3-5 | 60 | 40 | 0 | 7610 | 1.3 | 3.1 | Very good | Good |
| 3-6 | 40 | 40 | 20 | 7860 | 1.2 | 4.2 | Very good | Good |
| 3-7 | 20 | 40 | 40 | 7720 | 1.4 | 3.8 | Very good | Good |
| 3-8 | 0 | 40 | 60 | 6520 | 1.9 | 1.8 | Good | Good |
| 3-9 | 80 | 20 | 0 | 7190 | 1.8 | 2.6 | Good | Good |
| 3-10 | 60 | 20 | 20 | 7290 | 1.6 | 2.2 | Good | Good |
| *3-11 | 40 | 20 | 40 | 7240 | 1.5 | 0.1 | Poor | — |
| 3-12 | 30 | 30 | 40 | 7680 | 1.4 | 3.0 | Very good | Good |
| 3-13 | 30 | 70 | 0 | 7100 | 1.8 | 1.3 | Good | Good |
| *3-14 | 10 | 70 | 20 | 6640 | 2.4 | 0.0 | Poor | — |

As is clear from Table 4, the samples of the present invention had a good soldering property, a small dielectric loss and a large terminal strength.

In Table 4, Sample No. 3-1 deviated from the adequate range of vitrification, and did not show good characteristics. In Sample Nos. 3-4 and 3-14, although they showed good capacity, their dielectric loss was large, their terminal strength was low, and their soldering property was poor. Sample No. 3-11 was found to show good values for the capacity and dielectric loss, but to show a low terminal strength and was not soldered.

A paste for a copper-baked electrode was produced by thoroughly dispersing 1 to 22 wt % of PbO—B$_2$O$_3$—ZnO glass frit having a molar percentage composition for Sample No. 3-6 in Table 4 and 66 to 87 wt % of the above-mentioned boric acid-coated fine copper powder, and 12 wt % of an organic vehicle produced by dissolving cellulose in terpineol (concentration: 8 wt %) through a kneader such as a three-roll mill. The electrostatic capacity, the dielectric loss, the terminal strength, the soldering property and the permeation of solder were determined in the same manner as those in Table 4. The results are shown in Table 5. In Table 5, samples marked by an asterisk (*) are outside the scope of the present invention, and the other samples are within the scope of the present invention.

TABLE 5

| Sample No. | Fine Cu powder (wt %) | Glass frit (wt %) | Organic vehicle (wt %) | Electrostatic capacity (pF) | Dielectric loss (%) | Terminal strength (kg) | Soldering property | Permeation of solder |
|---|---|---|---|---|---|---|---|---|
| *4-1 | 87 | 1 | 12 | 6810 | 1.8 | 0.3 | Poor | — |
| 4-2 | 85 | 3 | 12 | 7280 | 1.6 | 1.5 | Good | Good |
| 4-3 | 78 | 10 | 12 | 7850 | 1.2 | 4.3 | Very good | Good |
| 4-4 | 73 | 15 | 12 | 7410 | 1.4 | 3.5 | Very good | Good |
| 4-5 | 70 | 18 | 12 | 7030 | 1.9 | 1.6 | Good | Good |
| *4-6 | 66 | 22 | 12 | 6190 | 3.0 | 0.2 | Poor | — |

As is clear from Table 5, the samples of the present invention had good soldering property, a small dielectric loss and a large terminal strength.

In Table 5, Sample No. 4-1 had a low adhesion strength between the electrode and the dielectric ceramic body, and Sample No. 4-6 had a low electric conductivity.

The glass frit of Sample No. 3-6 shown in Table 4 was examined for coloring of the electrode, soldering property, and solder permeation depending on the baking temperature. The results are shown in Table 6.

The soldering property was measured in the following manner: The dielectric ceramic body having the electrode was immersed in molten solder using a rosin flux, and the soldering property was visually evaluated.

TABLE 6

| Baking temperature (°C.) | Coloring of electrode due to burning Visual observation of appearance | Soldering property Solder: H60A Rosin flux Visual observation | Permeation of solder Polishing cross-section Visual observation |
|---|---|---|---|
| 400 | Poor | Poor | — |
| 450 | Medium | Medium | — |
| 500 | Good | Good | Medium |
| 550 | Good | Good | Good |
| 600 | Good | Good | Good |
| 650 | Good | Good | Good |
| 700 | Medium | Medium | Good |
| 800 | Poor | Poor | — |
| 900 | Poor | Poor | — |

As shown in Table 6, in a temperature range of 500° to 650° C., the electrode was baked in a good condition, and the soldering property was found to have a value of not less than 90%. As a result of the visual evaluation of solder permeation by polishing the cross-section of the electrode, in a temperature range of 550° to 700° C., no solder permeation was observed. Consequently, the optimum baking temperature could be considered to be in the range of 550° to 650° C.

EXAMPLE 3

A paste for a copper-baked electrode was prepared. A fine copper powder having a particle size of 1 μm was admixed with 0.01 to 0.1 wt % of boric acid as boron atom content based on the fine copper powder, and a solvent selected from ketone solvents, hydrocarbon solvents and aromatic solvents in such an amount that the concentration of boric acid was not more than saturated concentration, and then dried to remove the solvent, giving a fine copper powder coated with boric acid.

A paste for a copper-baked electrode was produced by thoroughly dispersing 80 wt % of the boric acid-coated fine copper powder, 8 wt % of PbO—$B_2O_3$—ZnO glass frit having mole percent compositions shown in Table 7, and 12 wt % of organic vehicle produced by dissolving cellulose in terpineol (concentration: 8 wt %) through a kneader such as a three-roll mill. In this example, the amount of the glass frit was approximately 9.09 wt % based on the amount of the fine copper powder.

The resulting paste was applied on a barium titanate ceramic, as a dielectric ceramic body, comprising $BaTiO_3$ to which $CaZrO_3$, $MgTiO_3$, $CeO_2$, $Bi_2O_3$, and $SnO_2$ were added as described in JP-B-60-31793 by a screen printing, it was baked at a peak temperature of 600° C. for a retaining period of 10 minutes and a total period of baking of 60 minutes in a neutral atmosphere (nitrogen).

The ceramic capacitor thus obtained was measured for electrostatic capacity, dielectric loss, terminal strength, soldering property, and permeation of solder. The results obtained are also shown in Table 7.

The tensile strength of the electrode was measured in the following manner: A lead wire having a diameter of 0.6 mm was soldered to an electrode formed by baking on a circular dielectric ceramic body having a diameter of 14.0 mm and a thickness of 0.5 mm in the manner described above, and the tensile strength was measured at a constant speed of 120 mm/min.

The soldering property was measured in the following manner: The dielectric ceramic body having the electrode was immersed in molten solder using a rosin flux, and the soldering property was visually evaluated.

The permeation of solder was visually evaluated by polishing the cross-section of the electrode.

In Table 7, samples marked with an asterisk (*) are outside the scope of the present invention, and the other samples are within the scope of the present invention.

TABLE 7

| Sample No. | Glass frit (mol %) | | | Electrostatic capacity (pF) | Dielectric loss (%) | Terminal Strength (Kg) | Soldering property | Permeation of solder |
|---|---|---|---|---|---|---|---|---|
| | PbO | $B_2O_3$ | ZnO | | | | | |
| *5-1 | 20 | 80 | 0 | — | — | — | Poor | — |
| 5-2 | 40 | 60 | 0 | 15230 | 1.4 | 2.8 | Very good | Good |
| 5-3 | 20 | 60 | 20 | 14420 | 1.9 | 1.2 | Good | Good |
| *5-4 | 0 | 60 | 40 | 12740 | 3.8 | 0.2 | Poor | — |
| 5-5 | 60 | 40 | 0 | 15550 | 1.2 | 2.9 | Very good | Good |
| 5-6 | 40 | 40 | 20 | 16030 | 1.0 | 3.8 | Very good | Good |
| 5-7 | 20 | 40 | 40 | 15490 | 1.3 | 3.6 | Very good | Good |
| 5-8 | 0 | 40 | 60 | 14620 | 1.8 | 1.5 | Good | Good |
| 5-9 | 80 | 20 | 0 | 14250 | 1.5 | 2.3 | Good | Good |
| 5-10 | 60 | 20 | 20 | 13830 | 2.1 | 2.1 | Good | Good |
| *5-11 | 40 | 20 | 40 | 12950 | 1.9 | 0.2 | Poor | — |
| 5-12 | 30 | 30 | 40 | 16680 | 0.9 | 3.2 | Very good | Good |
| 5-13 | 30 | 70 | 0 | 17070 | 1.1 | 1.7 | Good | Good |
| *5-14 | 10 | 70 | 20 | 12830 | 3.0 | 0.3 | Poor | — |

As is clear from Table 7, the samples of the present invention had a good soldering property, a small dielectric loss and a large terminal strength.

In Table 7, Sample No. 5-1 deviated from the adequate range of vitrification, and did not show good characteristics. In Sample Nos. 5-4 and 5-14, although they showed good capacity, their dielectric loss was large, their terminal strength was low, and their soldering property was poor. Sample No. 5-11 was found to show good values for the capacity and dielectric loss, but to show a low terminal strength and was not soldered.

A paste for a copper-baked electrode was produced by thoroughly dispersing 1 to 22 wt % of PbO—$B_2O_3$—ZnO glass frit having a molar percentage composition for Sample No. 5-6 in Table 7 and 66 to 87 wt % of the above-mentioned boric acid-coated fine copper powder, and 12 wt % of an organic vehicle produced by dissolving cellulose in terpineol (concentration: 8 wt %) through a kneader such as a three-roll mill. The electrostatic capacity, the dielectric loss, the terminal strength, the soldering property and the permeation of solder were determined in the same manner as those in Table 1. The results are shown in Table 8. In Table 8, samples marked by an asterisk (*) are outside the scope of the present invention, and the other samples are within the scope of the present invention.

TABLE 8

| Sample No. | Fine Cu powder (wt %) | Glass frit (wt %) | Organic vehicle (wt %) | Electrostatic capacity (pF) | Dielectric loss (%) | Terminal strength (kg) | Soldering property | Permeation of solder |
|---|---|---|---|---|---|---|---|---|
| *6-1 | 87 | 1 | 12 | 13810 | 2.1 | 0.1 | Poor | — |
| 6-2 | 85 | 3 | 12 | 14380 | 1.5 | 2.6 | Good | Good |
| 6-3 | 78 | 10 | 12 | 16100 | 1.0 | 3.7 | Very good | Good |
| 6-4 | 73 | 15 | 12 | 15640 | 1.2 | 2.9 | Very good | Good |
| 6-5 | 70 | 18 | 12 | 14960 | 1.8 | 1.2 | Good | Good |
| *6-6 | 66 | 22 | 12 | 12870 | 3.7 | 0.3 | Poor | — |

As is clear from Table 8, the samples of the present invention had good soldering property, a small dielectric loss and a large terminal strength.

In Table 8, Sample No. 6-1 had a low adhesion strength between the electrode and the dielectric ceramic body, and Sample No. 6-6 had a low electric conductivity.

The glass frit of Sample No. 5-6 shown in Table 7 was examined for coloring of the electrode, soldering property, and solder permeation depending on the baking temperature. The results are shown in Table 9.

The soldering property was measured in the following manner: The dielectric ceramic body having the electrode was immersed in molten solder using a rosin flux, and the soldering property was visually evaluated.

TABLE 9

| Baking temperature (°C.) | Coloring of electrode due to burning Visual observation of appearance | Soldering property Solder: H60A Rosin flux Visual observation | Permeation of solder Polishing cross-section Visual observation |
|---|---|---|---|
| 400 | Poor | Poor | — |
| 450 | Medium | Medium | — |
| 500 | Good | Good | Medium |
| 550 | Good | Good | Good |
| 600 | Good | Good | Good |
| 650 | Good | Good | Good |
| 700 | Medium | Medium | Good |
| 800 | Poor | Poor | — |
| 900 | Poor | Poor | — |

As shown in Table 9, in a temperature range of 500° to 650° C., the electrode was baked in a good condition, and the soldering property was found to have a value of not less than 90%. As a result of the visual evaluation of solder permeation by polishing the cross-section of the electrode, in a temperature range of 550° to 700° C., no solder permeation was observed. Consequently, the optimum baking temperature could be considered to be in the range of 550° to 650° C.

EXAMPLE 4

Into the glass frit comprising at least one of boron oxide, lead oxide and zinc oxide as main ingredients, (PbO—B$_2$O$_3$—ZnO)=(40, 40, 20) mol %, used in Example 1 was incorporated at least one of Al$_2$O$_3$ and/or SiO$_2$ in a weight ratio of 0.5 to 12.0 wt %. The paste was prepared in the same manner as in Example 1.

The resulting paste was applied on a barium titanate ceramic, as a dielectric ceramic body, comprising BaTiO$_3$ to which CaZrO$_3$, MgTiO$_3$, CeO$_2$, Bi$_2$O$_3$, and SnO$_2$ were added as described in JP-B-60-31793 by a screen printing, and then it was baked at a peak temperature of 600° C. for a retaining period of 10 minutes and a total period of baking of 60 minutes in a neutral atmosphere (nitrogen).

The ceramic capacitor thus obtained was measured for electrostatic capacity, dielectric loss, terminal strength, soldering property, and permeation of solder. The results obtained are also shown in Table 10.

The tensile strength of the electrode was measured in the following manner: A lead wire having a diameter of 0.6 mm was soldered to an electrode formed by baking on a circular dielectric ceramic body having a diameter of 14.0 mm and a thickness of 0.5 mm in the manner described above, and the tensile strength was measured at a constant speed of 120 mm/min.

The soldering property was measured in the following manner: The dielectric ceramic body having the electrode was immersed in molten solder using a rosin flux, and the soldering property was visually evaluated.

The permeation of solder was visually evaluated by polishing the cross-section of the electrode.

In the humidity resistant load test, the rate of lowering the capacity (ΔC) and the rate of increasing the dielectric loss relative to the initial capacity and the initial dielectric loss, respectively, were determined under the conditions of an AC voltage of 1.0 V, 95%RH, 60° C. and 1,000 hours.

In Table 10, samples marked with an asterisk (*) are outside the scope of the present invention, and the other samples are within the scope of the present invention.

TABLE 10

| Sample No. | Glass frit (wt %) | | | | Initial characteristics | | | | | Humidity resistant load test | |
|---|---|---|---|---|---|---|---|---|---|---|---|
| | PbO—B$_2$O$_3$—ZnO | Modification Oxides | | Electrostatic capacity (pF) | Dielectric loss (%) | Terminal strength (Kg) | Soldering property | Permeation of solder | ΔC. (%) | Increasing rate of dielectric loss (%) |
| | | Al$_2$O$_3$ | SiO$_2$ | | | | | | | |
| *7-1 | 100 | — | — | 16030 | 1.0 | 3.8 | Very good | Good | −22 | +2.1 |
| 7-2 | 99.5 | 0.5 | — | 16050 | 1.1 | 3.8 | Very good | Good | −16 | +1.7 |

TABLE 10-continued

| Sample No. | Glass frit (wt %) PbO—B₂O₃—ZnO | Modification Oxides Al₂O₃ | SiO₂ | Initial characteristics Electrostatic capacity (pF) | Dielectric loss (%) | Terminal strength (Kg) | Soldering property | Permeation of solder | Humidity resistant load test ΔC. (%) | Increasing rate of dielectric loss (%) |
|---|---|---|---|---|---|---|---|---|---|---|
| 7-3  | 98   | 2    | —    | 16000 | 1.0 | 3.9 | Very good | Good | −11 | +1.2 |
| 7-4  | 94   | 6    | —    | 15950 | 1.5 | 3.5 | Good      | Good | −12 | +1.2 |
| 7-5  | 90   | 10   | —    | 15920 | 1.9 | 1.3 | Medium    | Good | −20 | +1.8 |
| *7-6 | 88   | 12   | —    | 15410 | 3.5 | 0.4 | Poor      | Good | −35 | +3.6 |
| 7-7  | 99.5 | —    | 0.5  | 16050 | 1.0 | 3.6 | Very good | Good | −19 | +1.7 |
| 7-8  | 98   | —    | 2    | 16000 | 1.0 | 3.6 | Very good | Good | −12 | +1.3 |
| 7-9  | 94   | —    | 6    | 15980 | 1.4 | 3.5 | Good      | Good | −13 | +1.5 |
| 7-10 | 90   | —    | 10   | 15900 | 1.9 | 1.5 | Medium    | Good | −20 | +2.0 |
| *7-11| 88   | —    | 12   | 15380 | 3.2 | 0.5 | Poor      | Good | −37 | −4.1 |
| 7-12 | 99.5 | 0.25 | 0.25 | 16120 | 1.0 | 3.5 | Very good | Good | −18 | +1.5 |
| 7-13 | 98   | 1    | 1    | 16080 | 1.1 | 3.7 | Very good | Good | −12 | +1.2 |
| 7-14 | 94   | 3    | 3    | 16050 | 1.2 | 3.1 | Very good | Good | −10 | +1.2 |
| 7-15 | 90   | 5    | 5    | 15960 | 1.9 | 1.6 | Medium    | Good | −19 | +1.7 |
| *7-16| 88   | 6    | 6    | 15170 | 3.4 | 0.6 | Poor      | Good | −31 | +3.6 |

As is clear from Table 10, Sample Nos. 7-1 to 7-4, 7-7 to 7-9, and 7-12 to 7-14 had a good soldering property, a small dielectric loss, and a large terminal strength. They also had a small lowering rate of the capacity and a small increasing rate of dielectric loss.

In Table 10, Sample Nos. 7-5, 7-10 and 7-15 had good values for the capacity, but their dielectric loss was larger than those of Sample Nos. 7-1 to 7-4, 7-7 to 7-9, and 7-12 to 7-14, their terminal strength was low, and their soldering property was as low as 60%. In the humidity resistant load test, the decrease in the capacity was somewhat large, but they were within the practically applicable range.

In Table 10, Sample Nos. 7-6, 7-11 and 7-16 had good capacity, but had a large dielectric loss, a low terminal strength and a poor soldering property. In the humidity resistant load test, the decrease in the capacity was large, and the increase in the dielectric loss was large.

As shown in Table 11, the evaluation was carried out in the same manner as in Table 10 of Example 4 for the glass frits comprising at least one of boron oxide, lead oxide and zinc oxide as main ingredients (PbO—B₂O₃—ZnO)=(40, 60, 0), (60, 40, 0), (20, 40, 40), and (30, 30, 40) mol %. In all cases, the soldering properties was good, the dielectric loss was low, and the terminal strength was big. In the humidity resistant load test, it was found that the decrease in the capacity was small and the increase in dielectric loss was small.

TABLE 11

| Sample No. | Glass frit (wt %) PbO—B₂O₃—ZnO (mol %) PbO | B₂O₃ | ZnO | (wt %) | Modification Oxides (wt %) Al₂O₃ | SiO₂ | Initial characteristics Electrostatic capacity (pF) | Dielectric loss | Terminal strength | Soldering property | Permeation of solder | Humidity resistant load test ΔC. (%) | Increasing rate of dielectric loss (%) |
|---|---|---|---|---|---|---|---|---|---|---|---|---|---|
| *8-1 | 40 | 40 | 20 | 100 | —  | —  | 16030 | 1.0 | 3.8 | Very good | Good | −22 | +2.1 |
| 8-2  | 40 | 60 | 0  | 98  | 2  | —  | 15280 | 1.4 | 2.6 | Very good | Good | −12 | +1.2 |
| 8-3  | 40 | 60 | 0  | 98  | —  | 2  | 15300 | 1.4 | 2.3 | Very good | Good | −12 | +1.4 |
| 8-4  | 40 | 60 | 0  | 98  | 1  | 1  | 15580 | 1.4 | 2.4 | Very good | Good | −11 | +1.1 |
| 8-5  | 60 | 40 | 0  | 98  | 2  | —  | 15620 | 1.2 | 2.7 | Very good | Good | −12 | +1.3 |
| 8-6  | 60 | 40 | 0  | 98  | —  | 2  | 15430 | 1.2 | 2.5 | Very good | Good | −13 | +1.6 |
| 8-7  | 60 | 40 | 0  | 98  | 1  | 1  | 15500 | 1.2 | 2.8 | Very good | Good | −11 | +1.2 |
| 8-8  | 20 | 40 | 40 | 98  | 2  | —  | 15520 | 1.3 | 3.5 | Very good | Good | −12 | +1.1 |
| 8-9  | 20 | 40 | 40 | 98  | —  | 2  | 15450 | 1.3 | 3.6 | Very good | Good | −15 | +1.2 |
| 8-10 | 20 | 40 | 40 | 98  | 1  | 1  | 15480 | 1.3 | 3.5 | Very good | Good | −9  | +1.0 |
| 8-11 | 30 | 30 | 40 | 98  | 2  | —  | 16710 | 0.9 | 3.2 | Very good | Good | −10 | +1.2 |
| 8-12 | 30 | 30 | 40 | 98  | —  | 2  | 16750 | 0.9 | 3.1 | Very good | Good | −12 | +1.5 |
| 8-13 | 30 | 30 | 40 | 98  | 1  | 1  | 16620 | 0.9 | 2.8 | Very good | Good | −8  | +1.0 |

Subsequently, a weight (g) of a glass frit equal to its specific gravity was immersed in pure water at 99° C. or higher over a period of 60 minutes using a first class hard glass-made eluting device according to JIS R3502 to calculate the rate (%) of decrease in the weight of glass. The results obtained are shown in FIG. 2.

It is understood from FIG. 2 that when a small amount of Al₂O₃ and/or SiO₂ was added to the glass frit comprising at least one member selected from boron oxide, lead oxide and zinc oxide as essential ingredients, elution of glass into water was reduced to improve the water resistance of glass.

EXAMPLE 5

Into the glass frit comprising at least one of boron oxide, lead oxide and zinc oxide as main ingredients, (PbO—$B_2O_3$—ZnO)=(40, 40, 20) mol %, containing 2.0 wt % of $Al_2O_3$ and 2.0 wt % of $SiO_2$ as modification oxides was incorporated 0.2 to 1.5 wt % of alkali oxide, $R_2O$ (R represents at least one metal selected from Li, Na, K, Rb, and Cs). The paste was prepared in the same manner as in Example 1.

The resulting paste was applied on a barium titanate ceramic, as a dielectric ceramic body, comprising $BaTiO_3$ to which $CaZrO_3$, $MgTiO_3$, $CeO_2$, $Bi_2O_3$, and $SnO_2$ were added as described in JP-B-60-31793 by a screen printing, and then it was baked at a peak temperature of 600° C. for a retaining period of 10 minutes and a total period of baking of 60 minutes in a neutral atmosphere (nitrogen).

The ceramic capacitor thus obtained was measured for electrostatic capacity, dielectric loss, terminal strength, soldering property, and permeation of solder. The results obtained are also shown in Table 12. The measuring methods were the same as those in Table 10.

In Table 12, samples marked with an asterisk (*) are outside the scope of the present invention, and the other samples are within the scope of the present invention.

Second, according to the ceramic capacitor of the present invention, since it comprises a copper-baked electrode, a low-cost ceramic capacitor can be provided. In addition, since the copper-baked electrode has electrical and physical properties similar to those of a silver electrode, a ceramic capacitor excelling in high frequency characteristics can be obtained.

Third, according to the ceramic capacitor of the present invention, since the silver migration and the solder leach phenomenon, which have been unavoidable in the case of the silver electrode, do not take place at all, a highly reliable ceramic capacitor excelling in reliability and service life and having a low rate of lowering the capacity can be provided.

Fourth, according to the ceramic capacitor of the present invention, since the silver migration and the solder leach phenomenon do not take place at all even when microcracks occur in the dielectric ceramic body due to thermal shock during the soldering, a highly reliable ceramic capacitor without deterioration in the reliability and service life characteristics due to the above reason can be provided.

Fifth, according to the ceramic capacitor of the present invention, since the electrode is formed by baking, a ceramic capacitor having the electrode with strong adhesion and a large tensile strength, which is difficult to cause electrode peeling, can be provided.

TABLE 12

| | | | Initial characteristics | | | | | Humidity resistant load test | |
|---|---|---|---|---|---|---|---|---|---|
| | Glass frit | | Electrostatic | Dielectric | Terminal | | | | Increasing rate of |
| Sample No. | Type | Content (wt %) | capacity (pF) | loss (%) | strength (Kg) | Soldering property | Permeation of solder | ΔC. (%) | dielectric loss (%) |
| *9-1 | $K_2O$ | 0.0 | 16610 | 1.1 | 3.8 | Very good | Good | −10% | +1.0 |
| 9-2 | $K_2O$ | 0.2 | 16600 | 1.1 | 3.8 | Very good | Good | −8 | +1.0 |
| 9-3 | $K_2O$ | 0.6 | 16680 | 1.1 | 3.9 | Very good | Good | −5 | +0.6 |
| 9-4 | $K_2O$ | 1.0 | 16230 | 1.5 | 3.5 | Good | Good | −8 | +0.8 |
| 9-5 | $K_2O$ | 1.5 | 15490 | 1.5 | 1.3 | Good | Good | −15 | +1.6 |
| 9-6 | $Li_2O$ | 0.6 | 16580 | 1.3 | 3.7 | Very good | Good | −7 | +0.7 |
| 9-7 | $Na_2O$ | 0.6 | 16640 | 1.3 | 3.9 | Very good | Good | −6 | +0.8 |
| 9-8 | $Rb_2O$ | 0.6 | 16630 | 1.0 | 3.8 | Very good | Good | −5 | +0.6 |
| 9-9 | $Cs_2O$ | 0.6 | 16640 | 1.0 | 3.5 | Very good | Good | −5 | +0.6 |
| 9-10 | $K_2O$ $Li_2O$ | 0.3 0.3 | 16560 | 1.0 | 3.0 | Very good | Good | −7 | +0.6 |
| 9-11 | $K_2O$ $Na_2O$ | 0.3 0.3 | 16620 | 1.0 | 3.0 | Very good | Good | −6 | +0.6 |

As is clear from Table 12, when a small amount of an alkali oxide was added to the glass frit comprising PbO—$B_2O_3$—ZnO—$Al_2O_3$—$SiO_2$, the rate of lowering the capacity and the rate of increasing dielectric loss were suppressed by 50%.

As described above, according to the present invention, the following effects can be obtained:

First, according to the ceramic capacitor of the present invention, since lead-borate-zinc glass frit is used, the baking can be carried out at a low temperature of 550° to 650° C. in a non-oxidizable atmosphere without oxidizing copper and reducing ceramics. Consequently, since the lowering of the capacity due to the reduction of the ceramic does not take place, a large electrostatic capacity can be obtained and, thus, a ceramic capacitor having a small dielectric loss can be provided.

Sixth, according to the ceramic capacitor of the present invention, by incorporating at least one of $Al_2O_3$ and $SiO_2$ as the modification oxide into the glass frit comprising at least one member selected from boron oxide, lead oxide and zinc oxide as essential ingredients, the elution of glass into water is reduced, and the water resistance of glass is improved, resulting in a ceramic capacitor having little deterioration in humidity resistance.

Seventh, according to the ceramic capacitor of the present invention, by incorporating at least one of $Al_2O_3$ and $SiO_2$, as well as $R_2O$ (where R represents at least one metal selected from Li, Na, K, Rb, and Cs), as the modification oxide into the glass frit comprising at least one member selected from boron oxide, lead oxide and zinc oxide as essential ingredients, the elution of glass into water is reduced, and the water resistance of glass is improved, resulting in a ceramic capacitor of the present invention having little deterioration in humidity resistance.

While the invention has been described in detail and with reference to specific examples thereof, it will be apparent to one skilled in the art that various changes and modifications can be made therein without departing from the spirit and scope thereof.

What is claimed is:

1. A ceramic capacitor comprising a dielectric ceramic body having on the surface thereof a baked electrode comprising a fine copper powder and from 2 to 20 weight percent based on the amount of said fine copper powder of a borate glass frit comprising boron oxide and at least one member selected from lead oxide and zinc oxide, and at least one member selected from $Al_2O_3$ and $SiO_2$ as modification oxides, and further comprises $R_2O$, where R represents at least one metal selected from Li, Na, K, Rb, and Cs, as modification oxides.

2. A ceramic capacitor as claimed in claim 1, wherein said glass frit has a softening point of from 350° to 500° C.

3. A ceramic capacitor as claimed in claim 1, wherein said glass frit falls within the region surrounded by lines connecting the apices A1 (30, 70, 0), B1 (0, 40, 60), C1 (60, 20, 20), D1 (80, 20, 0) in terms of (X, Y, Z) mol % in the ternary diagram of $xPbO-yB_2O_3-zZnO$.

4. A ceramic capacitor as claimed in claim 3, wherein said glass frit falls within the region surrounded by lines connecting the apices A2 (40, 60, 0), B2 (20, 40, 40), C2 (30, 30, 40), D2 (60, 40, 0) in terms of (X, Y, Z) mol % in the ternary diagram of $xPbO-yB_2O_3-zZnO$.

5. A ceramic capacitor as claimed in claim 1, wherein said glass frit contains at least one member selected from $Al_2O_3$ and $SiO_2$ as modification oxides in an amount of from 0.5 to 10.0 wt % based on the total amount of said glass frit, and $R_2O$, where R represents at least one metal selected from Li, Na, K, Rb, and Cs, as modification oxides in an amount of from 0.2 to 1.0 wt % based on the total amount of said glass frit.

6. A ceramic capacitor as claimed in claim 3, wherein said glass frit has a softening point from 350° to 500° C. and contains at least one member selected from $Al_2O_3$ and $SiO_2$ as modification oxides in an amount from 0.5 to 10 wt. percent based on the total amount of said glass frit and $R_2O$ as modification oxide in an amount of from 0.2 to 1.0 wt % based on the total amount of said glass frit, said fine copper is coated with boric acid on the surface thereof and said dielectric ceramic body comprises barium titanate.

7. A ceramic capacitor as claimed in claim 6, wherein said baked electrode is a 550° to 650° C. baked electrode.

* * * * *